United States Patent

Becker et al.

Patent Number: 5,805,100
Date of Patent: Sep. 8, 1998

[54] METHOD AND APPARATUS FOR UNIVERSAL DISPLAY OF ALPHANUMERIC DATA ON RADAR DISPLAYS

[75] Inventors: Eric Karl Becker; Robert John Olson, both of Peoria; Robert Stebbing Doyle, Glendale, all of Ariz.

[73] Assignee: Honeywell Inc.

[21] Appl. No.: 732,865

[22] Filed: Oct. 15, 1996

[51] Int. Cl.⁶ .................................................. G01S 13/95
[52] U.S. Cl. ............................................................. 342/26
[58] Field of Search .............................. 312/26; 395/150; 345/143, 23, 116

[56] References Cited

U.S. PATENT DOCUMENTS 5,410,647  4/1995  Peaslee et al. ........................ 395/150

*Primary Examiner*—Daniel T. Pihulic
*Attorney, Agent, or Firm*—Charles J. Ungemach; Brian C. Downs

[57] ABSTRACT

A radar system embeds information into the radar picture data for display on any display device. The radar receiver communicates weather data to a signal processor which generates a weather array. An I/O processor transmits data in the weather array to a display device via a picture bus. Alphanumeric data which is to be embedded into or combined with the weather array is stored in a message array. Font information for each alphanumeric character is stored in a font array. The message array and the font array are combined and translated into a text array which corresponds to the weather array. Prior to transmitting each radial of data to the display device, the I/O processor copies the appropriate radial data from the text array to the weather array thereby causing the desired alphanumeric characters to be displayed on the display device.

11 Claims, 4 Drawing Sheets

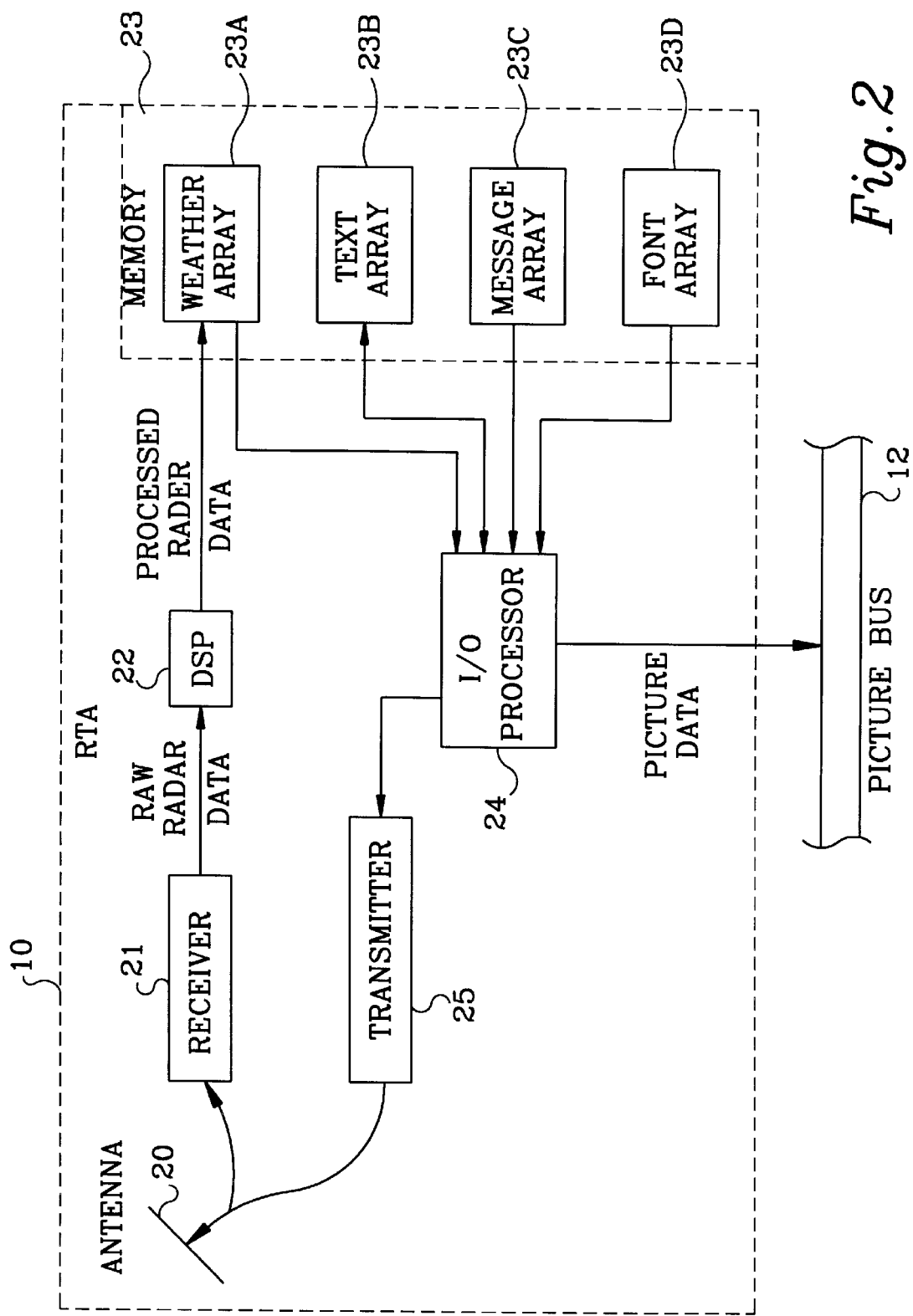

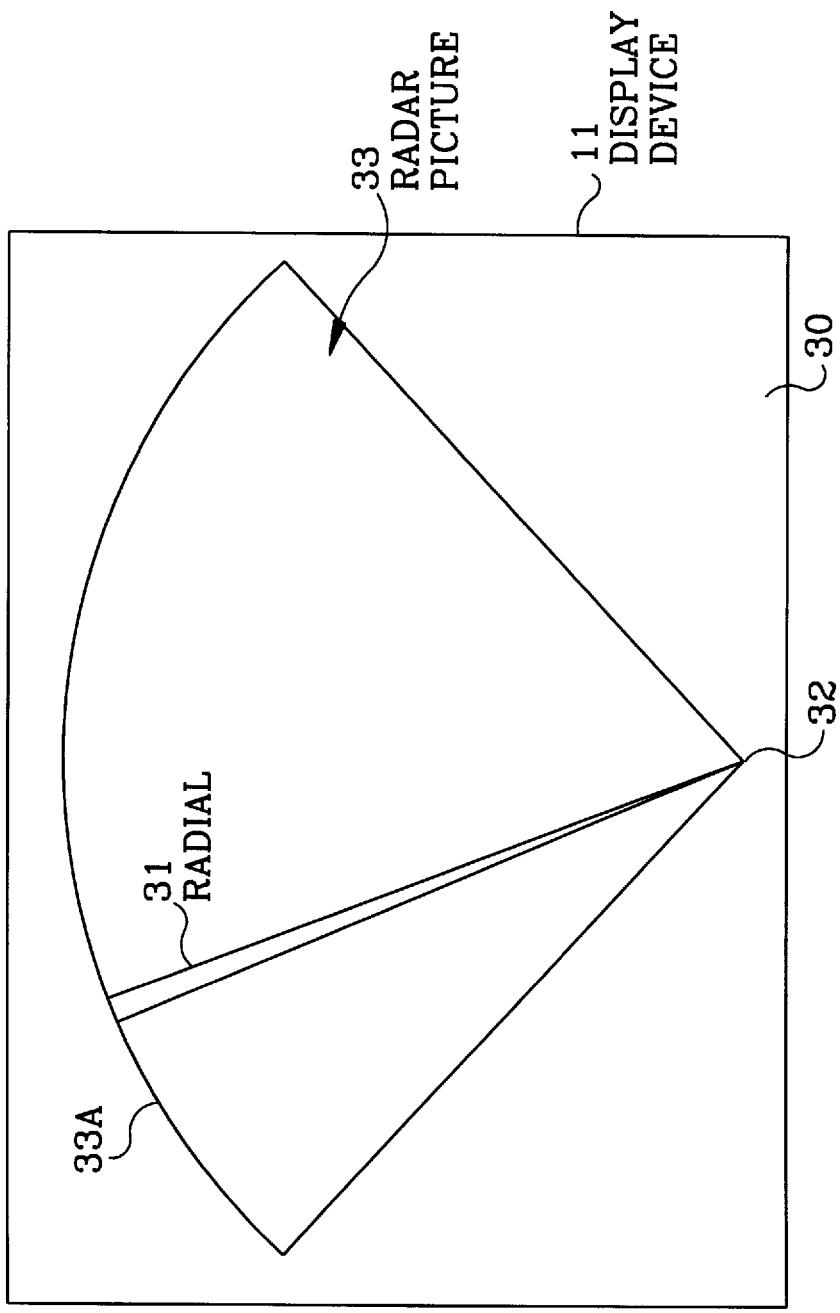

ALPHANUMERIC FAULTS DISPLAY

STABILIZATION TRIM MODE DISPLAY

METHOD AND APPARATUS FOR UNIVERSAL DISPLAY OF ALPHANUMERIC DATA ON RADAR DISPLAYS

BACKGROUND OF INVENTION

The present invention relates generally to radar and more specifically to airborne weather radar systems and displays.

A significant danger to aircraft is bad weather such as rain storms and thunderstorms. Thunderstorms and similar weather conditions have caused numerous aircraft accidents. Many more aircraft survive encounters with bad weather, however, the passengers and crew may have endured severe turbulence. Airborne weather radar systems were introduced to help pilots reduce the risk of flying into rain storms, thunderstorms, and the like.

Weather radar systems help pilots avoid bad weather by detecting and locating rainfall and communicating this information to the pilot. The radar detects the rainfall by emitting an electromagnetic pulse which is reflected by the falling rain back to the aircraft where it is received and interpreted by the radar. The distance to the rain is proportional to the time between when the pulse is emitted and when the reflected pulse is detected. The severity of the rainfall is roughly proportional to the strength of the received signal. A weak received signal indicating light rain and a strong received signal indicating heavy rain.

Most weather radar systems display the information on a display device such as a color CRT or flat panel. Typically, light rain is depicted by green coloring and progressively heavier rainfall is depicted by yellow, red, and magenta coloring.

Data is communicated from the radar LRU(line replaceable unit) or receiver/transmitter/antenna assembly to the display device by communications buses. Currently, these communications buses are comprised of a high speed picture bus and a low speed mode bus. The picture bus communicates the picture data which communicates the color of each pixel of weather data on the display. The mode bus communicates mode, range, failure codes, and the like. Examples of these buses is found in the industry standard ARINC 708 and ARINC 708A bus standards, produced by Aeronautical Radio, Inc., 2551 Riva Road, Annapolis, Md., which are incorporated herein by reference.

A problem with current weather radar systems is that messages are not user friendly. Standard bus specifications typically provide only limited codes (typically less than 16) and the display device is designed to only display a standard message when the code is received. These standard messages are often cryptic, such as "FAIL CODE 7". An operator is unlikely to know what this code means and therefore must look up the meaning in a manual.

Another problem is that messages such as failure codes, failure warnings, test modes, and the like are not easily changed or updated. In order to change or upgrade the messages, both the radar LRU(or RTA) and the display device must be modified.

More of a problem, a radar system may indicate a failure condition when, in fact, the failure is due to another aircraft system such as the AHRS(attitude heading reference system) or the airdata system. The standard buses often do not provide a code for all such conditions. Consequently, a great deal of time is wasted by removing and testing radar systems when, in fact, a different aircraft system has failed. In some cases, the aircraft may needlessly be dispatched without a functional weather radar because of the time needed to diagnose and fix the problem.

A related problem is that the standard radar interfaces are not user friendly. As noted above, the failure codes are often merely numbers which must be looked up in a manual to discover their meaning. Also, tasks such as adjusting the stabilization is overly complex. Some systems require a technician to physically adjust potentiometers and the like to achieve correct stabilization.

Aircraft weather radar systems would be improved, MTBUR(mean time between unscheduled removals) would be increased, user interfaces improved, and maintenance costs reduced by a weather radar system which improves the human interface of both current and retrofit radar systems and displays. Clearly there exists the need for such an improved weather radar system.

SUMMARY OF THE INVENTION

The invention discloses a radar system which embeds information into the radar picture data for display on any conventional radar display device. The radar receiver provides a received signal to a signal processor which generates weather data and stores it in a weather data array. Alphanumeric data which is to be displayed on the display device is stored in a message array. Font information for each alphanumeric character is stored in a font array(also referred to as a font table). The message array and the font array are combined and translated into a text array which corresponds to the weather data array. Prior to communicating each radial of data to the display device, the I/O processor combines the appropriate radial data from the text array with the corresponding data from the weather data array. The combined radial data is then transmitted to the display device via a high speed picture bus thereby causing the desired alphanumeric characters to be displayed on the display device.

A key to the invention is embedding alphanumeric data into the radar picture data which is then communicated to a display device via the high speed picture bus. By embedding alphanumeric data in the picture data, several advantages over the prior art are achieved.

First, messages can be changed or upgraded by merely upgrading the radar LRU (or RTA) without any changes to the mode bus. The display device does not have to be upgraded. Further, the change is easily accomplished by only modifying the software in the LRU. Costs are reduced since the display device need not be changed.

Second, messages are not limited to the 8 or 16 messages limits associated with the standard buses. The number of messages is virtually unlimited since the number of messages is only constrained by the memory storage size of the LRU.

Third, messages are not limited to brief cryptic codes. The messages may be long messages which are limited only by the display area. For example, the messages can be English sentences, commands, instructions, suggestions, data values, or the like. A message can print out what action should be taken, as opposed to merely printing a failure code.

Fourth, retrofitting a new LRU into an aircraft is much less expensive and easier since the new LRU can use the display device which is already installed. There is no need to replace the display device as was required in the prior art.

Therefore, the objects of the invention are to display arbitrary messages on a radar display device without changing the display device, reduce acquisition costs, reduce maintenance costs, improve MTBUR, and simplify retrofits.

A feature of the invention is alphanumeric data embedded in the picture data.

Another feature of the invention is alphanumeric data communicated across the picture bus.

The significant features of the invention are illustrated in the figures and described more fully below.

BRIEF DESCRIPTION OF THE DRAWINGS

FIG. 2 is a diagram of the key elements of the invention.

FIG. 3 shows a radial on a display device.

DETAILED DESCRIPTION

Figure 1:
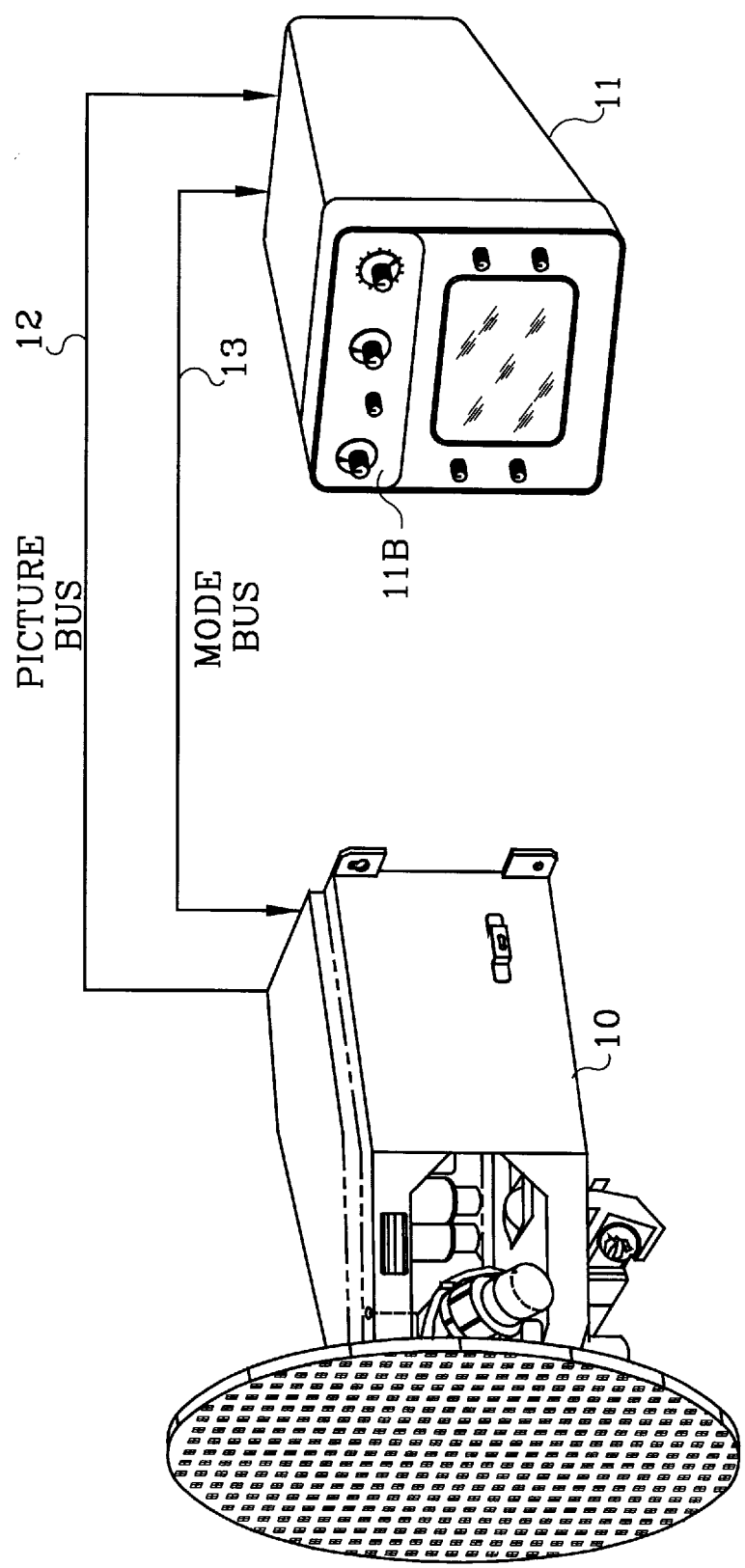
FIG. 1 illustrates a typical radar system.

FIG. 1 shows the components of a typical airborne weather radar system. Shown in FIG. 1 are receiver/transmitter/antenna assembly(RTA) 10, display device 11, picture bus 12, and mode bus 13.

Older radar systems often had an antenna which communicated to a separate LRU which contained the transmitter, receiver, processors, and related electronics. Currently, many radar systems combine the antenna with the receiver, transmitter, and processors into a single modular unit as shown.

Picture bus 12 and mode bus 13 communicate data between the RTA and the display device. Picture bus 12 is a high speed bus which communicates picture data from the RTA to the display device 11. Picture data describes the position and color of each pixel in the radar picture. Mode bus 13 is a low speed bus which communicates range, mode, failure codes, and the like to display device 11.

Display device 11 is shown with an integrated control panel 11B whereby an operator can control range, mode, and other features of the radar. Some embodiments, particularly those using EFIS(electronic flight instrument systems), have an independent control panel for controlling the radar.

FIG. 2 is a diagram of the key elements of the invention. Shown internal to RTA 10 are antenna 20, receiver 21, digital signal processor 22, memory 23, and I/O processor 24.

Receiver 21 receives signals from antenna 20 which have reflected back from objects such as precipitation. Receiver 21 is a conventional radar receiver. Receiver 21 communicates this raw radar data to signal processor 22.

Signal processor 22 processes the raw radar data in a conventional manner to yield processed radar data which is stored in memory 23 as an array of "range bins" which define the color of each pixel of the radar picture. This array is referred to as the weather data array or merely the weather array 23A. A dedicated digital signal processor such as signal processor 22 is often required, however, some embodiment may be able to accomplish both the signal processing tasks and the I/O tasks using a single high performance processor.

Memory 23 is conventional random access memory, but may also be any storage media suitable for storing and retrieving data.

Radar picture data is communicated to the display device using a polar coordinate system such that a packet of data representing a radial is transmitted together. A radial 31 of data, as shown in FIG. 3, extends from the an origin 32 to the edge of the radar picture. In the preferred embodiment, the radar picture is comprised of 512 radials and each radial is comprised of 256 pixels. Accordingly, the weather data array 23 is arranged as an array of data bytes, 512 columns by 256 rows, such that each column correlates to a radial.

Similar to the weather array, text array 23B is arranged as an array of data bytes. However, because the preferred embodiment only displays three lines of text in the middle of the radar picture area 33, text array 23B has only 66 rows. Displaying text only in the mid portion of the radar picture area is preferred since characters become distorted when they are near either the origin or the edge of the picture area. Also, three lines of text provides ample space to display messages.

Message array for storing the alphanumeric characters which are to be displayed on the display device. As discussed above, the preferred embodiment only requires three lines of messages where each line contains up to 32 characters. Therefore, message array 23C is merely 32 columns by three rows in size.

Font array 23D contains the bit maps for each of the alphanumeric characters displayed on the display device. In the preferred embodiment, Font array 23D is arranged as an array of arrays, wherein for each alphanumeric character there is an array, 22 rows by 16 columns, defining the pixel configuration of the character.

Arranging the weather data, the text data, the message data, and the font data into arrays makes it convenient to combine the data using conventional microprocessors and the like. The computer pseudo code below is representative of how this is accomplished.

As stated above, the picture data is transmitted to the display device in polar format as 512 radials of data. Each radial transmitted contains the angular offset (from −60 to +60 degrees) and 256 bytes of data(also referred to as range bins) containing the color level at each point on the radial. The result is an array which can be visualized as 256 range bins by 512 radials. For this reason it is convenient to use weather array of the same dimensions such as:

| $W_{256, -256}$ | $W_{256, -255}$ | $W_{256, -254}$ | ... | $W_{256, 256}$ |
| $W_{255, -256}$ | $W_{255, -255}$ | $W_{255, -254}$ | ... | $W_{255, 256}$ |
| . | . | . | | . |
| . | . | . | | . |
| . | . | . | | . |
| $W_{2, -256}$ | $W_{2, -255}$ | $W_{2, -254}$ | ... | $W_{2, 256}$ |
| $W_{1, -256}$ | $W_{1, -255}$ | $W_{1, -254}$ | ... | $W_{1, 256}$ |

The text array, discussed above, is a bit map and comprises 66 rows by 512 columns. Each column corresponding to a radial of picture data transmitted to the display device. An example of the text array is:

| $T_{66, -256}$ | $T_{66, -255}$ | $T_{66, -254}$ | ... | $T_{66, 256}$ |
| $T_{65, -256}$ | $T_{65, -255}$ | $T_{65, -254}$ | ... | $T_{65, 256}$ |
| . | . | . | | . |
| . | . | . | | . |
| . | . | . | | . |
| $T_{2, -256}$ | $T_{2, -255}$ | $T_{2, -254}$ | ... | $T_{2, 256}$ |
| $T_{1, -256}$ | $T_{1, -255}$ | $T_{1, -254}$ | ... | $T_{1, 256}$ |

Prior to transmitting each radial of picture data to the display device, a column of data from the text array is copied over the appropriate range bins of the radial beginning at a desired start range bin. This is easily accomplished as shown below:

start range bin=96

FOR r=1 TO 66

$W_{r+start\ range\ bin,\ radial} = T_{r_1\ radial}$

NEXT r

The text array is generated from the alphanumeric characters in the message array and the font array. The message array being 3 rows by 32 columns and the font array for each character being 16 rows by 22 columns. The font array actually being arranged as an array of arrays as described earlier. From this arrangement, the text array can be generated as follows:

```
FOR r = 1 to 3
  FOR c = 1 to 32
    start row = (r−1) * 22
    start col = ((c−1) * 16) − 256
    FOR R = 1 TO 22
      FOR C = 1 to 16
        T_{R+start row, C+start col} = F_{M, R, C}
      NEXT C
    NEXT R
  NEXT c
NEXT r
``` where M is the character index into the font array

The character index M can be generated, for example, by using the numerical value of the ASCII alphanumeric character. An offset may be subtracted from this value to normalize the offset. For example, an offset may be selected so that "A" is normalized to 1, "B" is normalized to 2, and so on.

FIG. 3 shows a radial on a display screen 30 of a display device 11. Radial 31 extends from the origin 32 to the edged of the radar picture area 33A. Radial 31 is comprised of 256 colored pixels indicative of the amount of precipitation or other reflective objects.

Figure 4A:
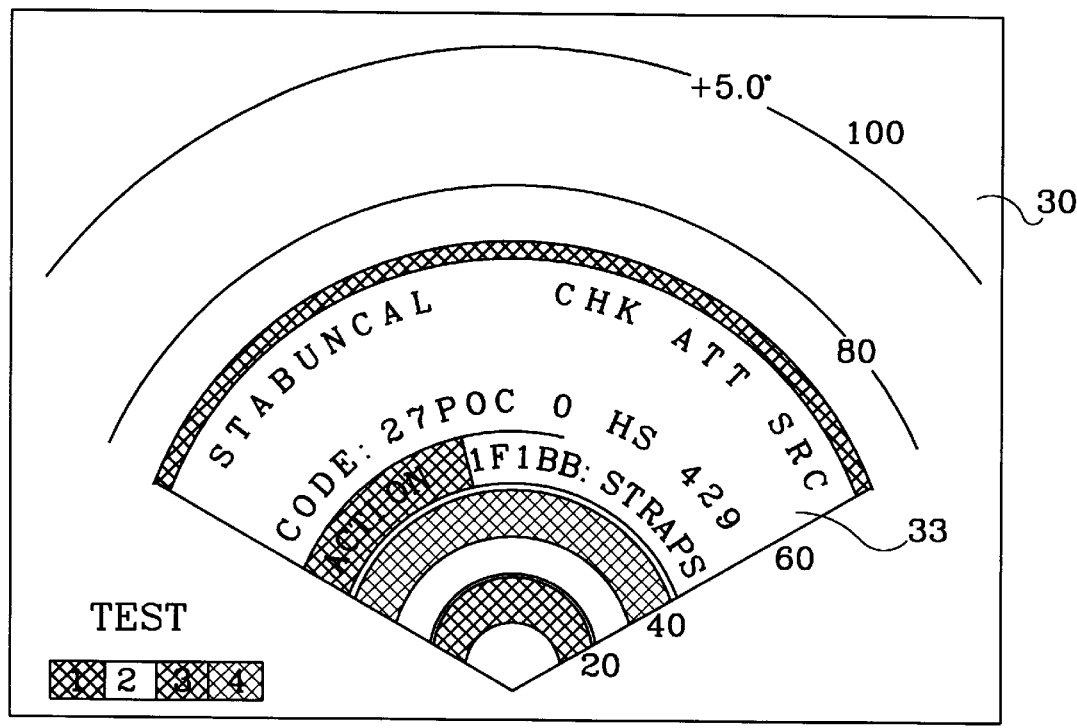
FIGS. 4a and 4b show samples of messages displayed using the invention.
Figure 4B:
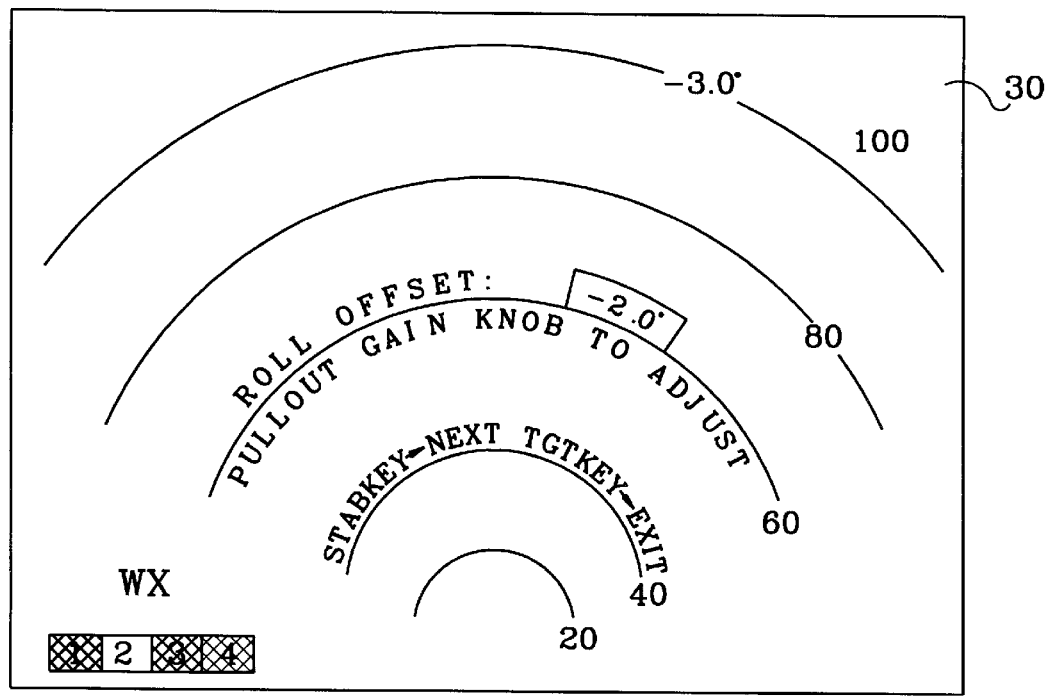

FIGS. 4A and 4B show samples of messages displayed using the invention.

FIG. 4A shows an alphanumeric faults display using the invention. Three lines of text messages are shown in the picture area 33. The upper line contains the text:

"STAB UNCAL CHK ATT SRC"

which communicates that stabilization is uncalibrated and also to check the attitude source for a possible failure.

The middle line contains the text:

"CODE: 27 POC 0 HS 429"

CODE 27 is a conventional error code corresponding to the stabilization uncalibrated fault message above. POC 0 is a power-on-count indicating to a maintenance person how long ago a fault occurred. HS 429 indicates that the currently selected attitude source(which has failed) is the high speed ARINC 429 source.

The lower line contains the text:

"XMIT ON! 1F1BB:STRAPS"

XMIT ON! indicates that the radar transmitter is transmitting. 1F1BB is a hexadecimal number indicating aircraft configuration strapping.

FIG. 4B shows a stabilization trim mode display. The upper line contains the text:

"ROLL OFFSET: −2.0"

which indicates that amount of offset added to the roll attitude input from the stabilization source(e.g. inertial reference system).

The middle line contains the text:

"PULL OUT GAIN KNOB TO ADJUST"

which is self explanatory directions to adjust the roll offset. The lower line contains the text:

"STAB KEY→NEXT TGT KEY →EXIT"

which indicates that selecting the STAB key will cycle to the next menu and selecting the TGT key will exit the stabilization adjustment procedure.

The invention is adaptable to essentially any type of electronic display including, but not limited to helmet mounted displays, CRTs displays, flat panel displays, and plasma displays.

This description has been for descriptive purposes only and is not intended to limit the scope of the invention. Those skilled in the art recognize numerous alternate embodiments of the invention which deviate from the described embodiment but still perform the same work in substantially the same way to achieve substantially the same result and are therefore equivalent to the invention.

It is clear from the foregoing that the present invention represents a new and useful airborne weather radar method and apparatus.

The embodiments of an invention in which an exclusive property or right is claimed are define as follows:

1. A airborne weather radar system comprising:
   a) a data storage unit having,
      1) a weather array containing data representative of weather phenomena detected by a radar receiver,
      2) a message array containing alphanumeric data representative of alphanumeric characters to be displayed on an attached radar display device, and,
      3) a font array containing bit map data representative of bit maps of said alphanumeric characters; and,
   b) an I/O processor in communication with said data storage unit, said I/O processor combining data in said message array and data in said font array to yield text data and combining said text data with the data in said weather array to yield radar picture data which is communicated to a display deviceusing a polar coordinate system.

2. The airborne weather radar system according to claim 1 further comprising:
   a) a radar display device suitable for displaying radar data; and, b) a picture bus communicating said radar picture data to said radar display device.

3. The airborne weather radar system according to claim 2 wherein alphanumeric characters representative of the alphanumeric data in said message array are displayed on said display device.

4. The airborne weather radar system according to claim 3 wherein said alphanumeric characters displayed on said display device include human readable fault messages.

5. The airborne weather radar system according to claim 4 wherein said alphanumeric characters displayed on said display device include stabilization trim mode instructions.

6. The airborne weather radar system according to claim 3 wherein said alphanumeric characters displayed on said display device include messages reporting installation faults.

7. The airborne weather radar system according to claim 3 wherein the alphanumeric characters displayed on said display device include roll offset data.

8. The airborne weather radar system according to claim 2 further comprising,
   a) a receiver generating a radar signal indicative of a received signal reflected by at least one object; and,
   b) a signal processor suitable for translating said radar signal into digital radar data and storing said digital radar data in said weather array.

9. A radar apparatus comprising:
   a) data storage means for storing weather data representative of objects detected by a radar apparatus and message data representative of alphanumeric characters desired to be displayed on an attached display unit;
   b) processing means for combining said weather data and said message data to form picture data suitable for communication to a radar display device using a polar coordinate system.

10. A method of displaying alphanumeric data on a conventional radar display device using a conventional picture bus, said method comprising the steps of:

a) providing a radar transmitter, a receiver, and an antenna, said receiver generating a radar signal indicative of a received signal reflected by at least one object;

b) providing a signal processor suitable for translating said radar signal into digital radar data;

c) providing message data representative of alphanumeric characters desired to be displayed on a radar display unit;

d) providing an I/O processor suitable for combining said digital radar data and said message data to form picture data; and , e) communicating said picture data to a radar display device using a polar coordinate system.

11. The method of displaying alphanumeric data according to claim 10 further comprising the step of, a) providing a radar display unit and a picture bus suitable for communicating picture data from said I/O processor to said display unit.

* * * * *